United States Patent [19]

Vigili

[11] Patent Number: 5,452,590
[45] Date of Patent: Sep. 26, 1995

[54] DRIVE DEVICE FOR THE CYLINDER OF A HOSIERY MACHINE AND ROTOR ASSEMBLY FOR A BRUSHLESS SYNCHRONOUS MOTOR

[75] Inventor: Gianluigi Vigili, Gavirate, Italy

[73] Assignee: A.C.M. Azienda Costruzione Motori s.a.s. di Racca Anita & C, Italy

[21] Appl. No.: 157,127

[22] Filed: Dec. 7, 1993

[30] Foreign Application Priority Data

Jul. 4, 1991 [IT] Italy .................................. VA91A0018
Jul. 31, 1991 [IT] Italy .................................. VA91U0006

[51] Int. Cl.⁶ .................................................. D04B 15/99
[52] U.S. Cl. .............................. 66/8; 310/67 R; 310/156; 66/1 R
[58] Field of Search ..................... 66/8, 1 R; 310/67 R, 310/186

[56] References Cited

U.S. PATENT DOCUMENTS

| | | | |
|---|---|---|---|
| 4,332,079 | 6/1982 | Silver | 310/156 X |
| 4,354,126 | 10/1982 | Yates | 310/156 |
| 4,504,755 | 3/1985 | Semones et al. | 310/156 |
| 4,617,726 | 10/1986 | Denk | 310/156 X |
| 4,642,502 | 2/1987 | Carpenter et al. | 310/156 |
| 4,661,736 | 4/1987 | Kawada et al. | 310/156 |
| 4,700,096 | 10/1987 | Epars | 310/156 X |
| 4,700,097 | 10/1987 | Kawada et al. | 310/156 X |

FOREIGN PATENT DOCUMENTS

| | | |
|---|---|---|
| 753087 | 10/1933 | France . |
| 1140921 | 10/1969 | United Kingdom . |
| 2151044 | 7/1985 | United Kingdom . |

*Primary Examiner*—John J. Calvert
*Attorney, Agent, or Firm*—Pollock, Vande Sande & Priddy

[57] ABSTRACT

A brushless motor for driving a cylinder-spindle of a hosiery machine comprises a rotor assembly and a stator. The rotor assembly is positioned directly on the outer cylindrical surface of the cylinder-spindle. The rotor assembly comprises at least one permanent magnet and a plurality of ferromagnetic polar expansions alternately coupled with the permanent magnets. A stator of the brushless motor, housed in a flanged tubular casing, is inserted directly over the rotor assembly. The brushless motor eliminates the customary belt transmission and bulkiness of a typical motor used in a hosiery machine, reducing the maintenance cost and space requirement under the bench of the hosiery machine.

7 Claims, 3 Drawing Sheets

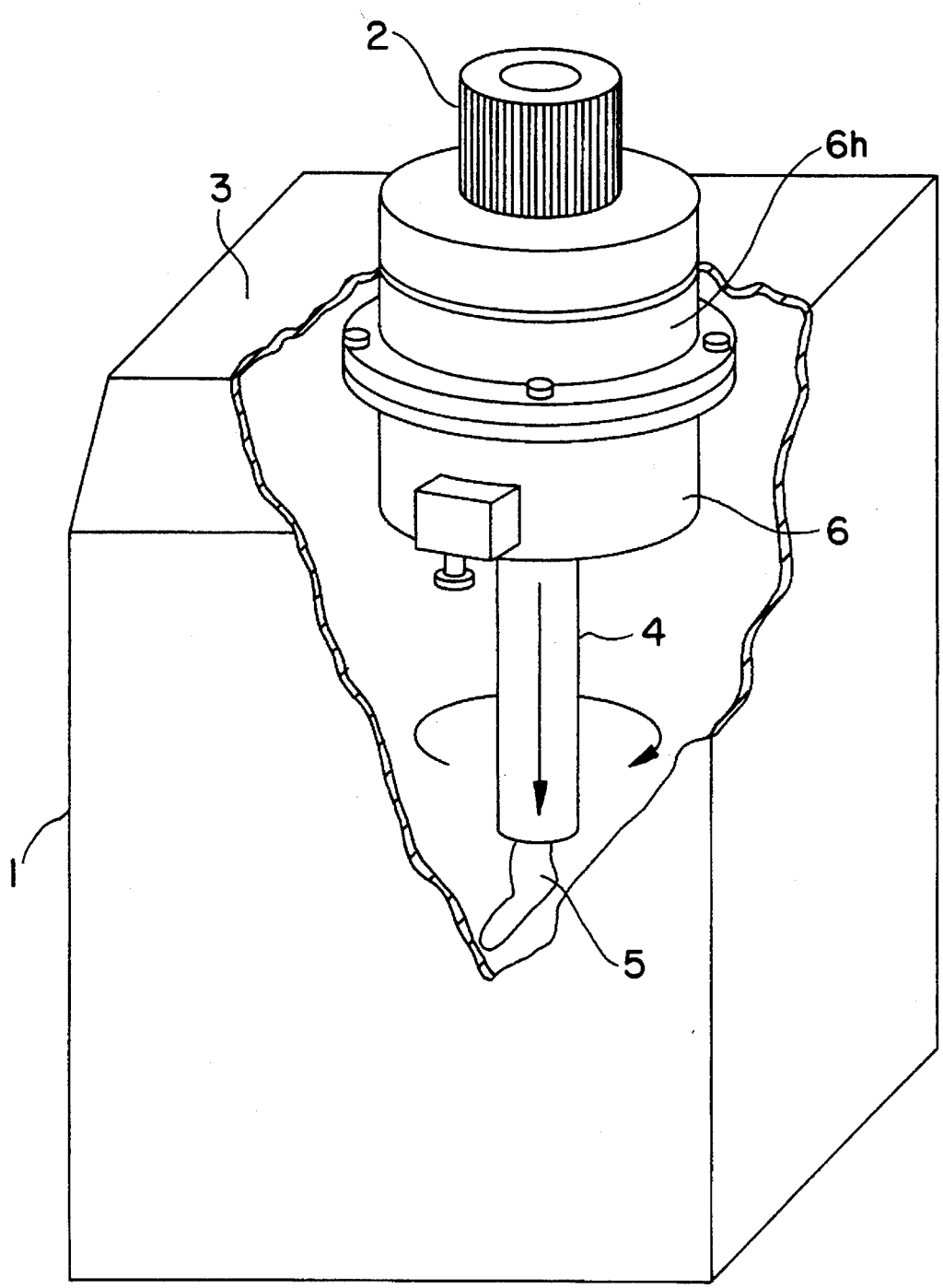
F I G. 1

DRIVE DEVICE FOR THE CYLINDER OF A HOSIERY MACHINE AND ROTOR ASSEMBLY FOR A BRUSHLESS SYNCHRONOUS MOTOR

BACKGROUND OF THE INVENTION

The present invention relates to a device for driving the-cylinder of a hosiery machine, i.e. a machine for manufacturing tubular fabrics, notably stockings and panty-hoses (collants) and in particular relates to rotor assembly of a brushless motor.

Knitting machines for producing tubular fabrics are commonly provided with a hollow cylinder, open at both ends, connected to a cylindrical knitting needle-head which is rotatably mounted on bearings on the machine's bench. Numerous mechanical components which are sequentially controlled by the speed of rotation of the knitting head cooperate with the latter and produce the desired knitting of the various textile threads which are customarily fed to the knitting head from a plurality of coils held in an aerial structure of the machine. The tubular fabric, the stocking or panty hose which is produced hangs down passing through a hollow cylinder connected to the knitting needle head and rotating together with the latter and is recovered through the bottom end of the rotating cylinder.

The cylinder acts as a rotating spindle of the knitting head and is rotated by means of a driving electric motor, which is housed under the machine's bench. Transmission of rotation to the spindle-cylinder of the machine is customarily made by means of a belt transmission between a motor's pulley and a pulley mounted on the machine's cylinder-spindle. These traditional transmissions have a nonnegligeable cost and exert a flexural force on the cylinder which on the other hand is often connected in a cantilever manner to the base of the knitting head. Moreover they encumber the cabinet space underneath the machine's bench and are often cause of stoppages for the periodic substitution of worn out belts, etc.

SUMMARY OF THE INVENTION

The present invention obviates all these drawbacks by providing a device for rotating a cylinder-spindle of a hosiery machine which is less cumbersome and expensive, more reliable and which does not require in practice any maintenance as compared with the known drive arrangements.

Basically the device of the invention is characterized by the fact that a rotor assembly comprising at least a pair of permanent magnets and a pair of polar expansions of a ferromagnetic material, is directly mounted on the outer cylindrical surface of the machine's cylinder and the assembly constitutes the rotor of a collector-less, asynchronous motor, cooperating with a stator winding which is held in a tubular stator casing operatively fixed to the underside of the machine's bench supporting said rotating knitting head.

According to a preferred embodiment, the cylinder is made of an amagnetic material and the rotor assembly utilizes permanent magnets having a rectilinear, flat-bar shape, held in radially disposed cavities defined between radially oriented opposing coupling faces of two adjacent ferromagnetic polar expansion pieces whose shape determines the realization of a functionally effective magnetic semicircuit.

BRIEF DESCRIPTION OF THE DRAWINGS

The peculiar aspects and related advantages of the drive device of the present invention will be recognized more easily through the following description of preferred embodiments and reference to the attached drawings, wherein:

FIG. 1 is a partial schematic illustration of a hosiery machine, equipped with a drive in accordance with the present invention;

DESCRIPTION OF THE PREFERRED EMBODIMENTS

Figure 2:
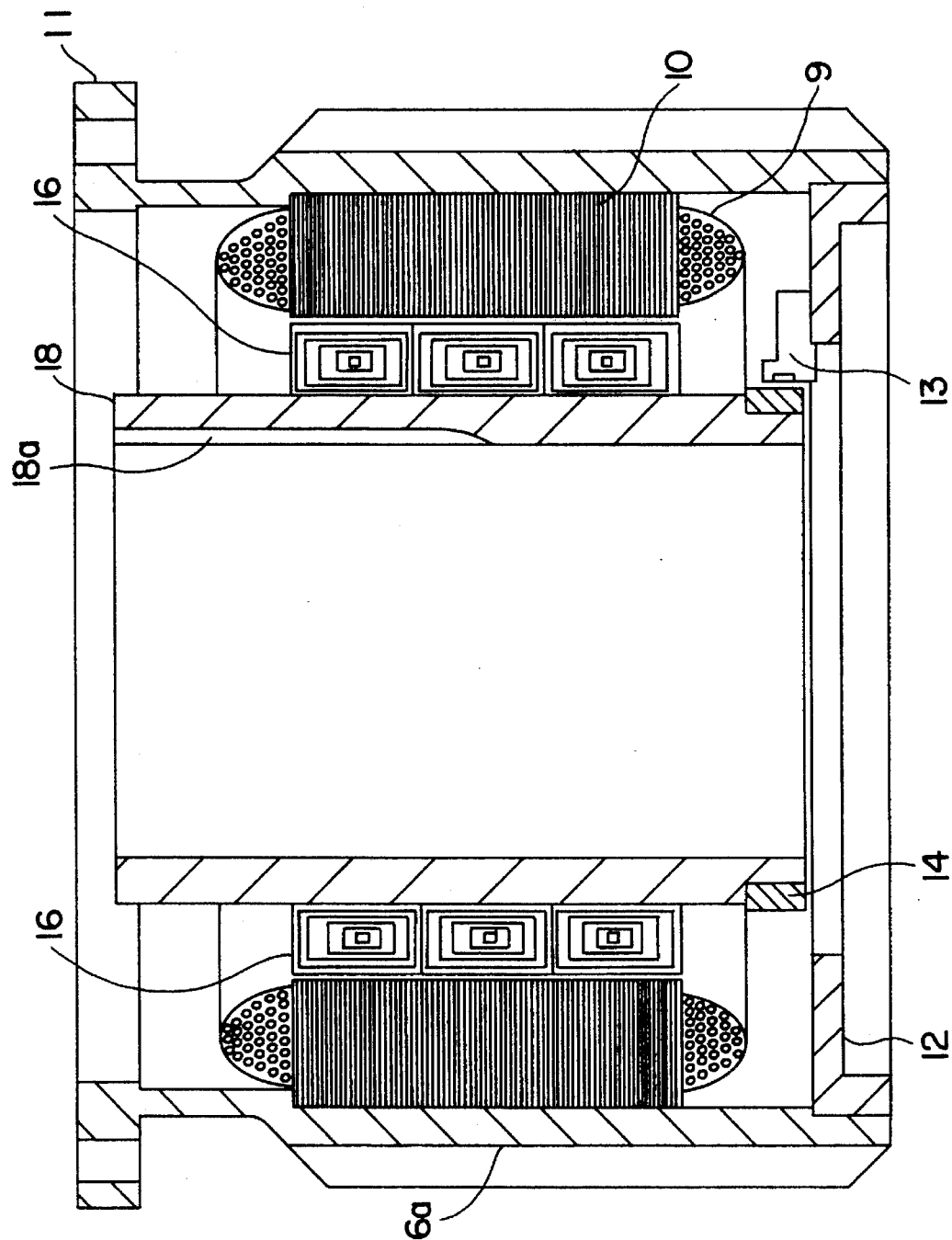
FIG. 2 is a simplified schematic cross-sectional view of an electric drive motor which utilizes the hosiery machine cylinder as a motor's shaft.

As shown in FIG. 1, a hosiery machine 1 for producing tubular fabrics, such as stockings and panty-hoses, essentially comprises a rotating knitting head 2, which is rotatably mounted on bearings on a bench 3 of the machine. A hollow cylinder 4, open at both extremities, is rigidly connected to the rotating knitting head 2 and the tubular fabric produced 5 passes through the cylinder 4. Beside that of a "keeper" of the produced fabric, the cylinder 4 has also the function of a spindle for rotating the knitting needle head 2.

As schematically shown in FIG. 1, in accordance with the present invention, the driving element for rotating the cylinder-spindle 4 of the machine is an electric motor 6, the rotor of which is formed directly on the outer cylindrical surface of the cylinder 4. Preferably the motor 6 is a brushless type, permanent magnet motor whose rotor consists of at least a pair of excitation permanent magnets and at least a pair of polar expansions of a ferromagnetic material, directly mounted over the cylinder 4 of the hosiery machine. The stator winding of the motor is housed in a substantially tubular stator casing which is supported concentrically about the rotor formed on the cylinder-spindle 4 of the machine by fixing the casing by means of a plurality of bolts to the lower face of the bench 3 of the machine or to a stationary basement 6h of the turning needle head 2 of the knitting machine and which is in turn fixed to the bench of the machine.

The polar expansions, among which or on which the excitation permanent magnets are fixed, may be directly mounted on the outer cylindrical surface of the cylinder 4 or on a sleeve which may be inserted over and mechanically keyed to the cylinder 4.

A preferred embodiment of the drive of the cylinder 4 of the hosiery machine is depicted in FIG. 2.

A rotor 8 which may be mechanically connected to the cylinder 4 may be formed by a cylindrical sleeve 18, having key way 18, of aluminum or of another amagnetic material, onto which polar expansions 16 made of a ferromagnetic material are fastened. Elongated permanent magnets (not shown in the figure) are functionally disposed between radially oriented lateral faces opposing each other of adjacent polar expansions. The stator winding 9, i.e. the stator armature formed by the winding and by the pack 10 of ferromagnetic laminae, is contained within a tubular casing 6a, which is provided with a flange 11 for fastening to a similar flange of a stationary basement of the knitting cylindrical needle head of the machine.

The relatively concentric position between opposing revolution surfaces of the rotor and of the stator may be ensured by, means of a spacing flange 12, which may be screwed into a threaded open end of the tubular casing 6a and provided with three or more circumferentially spaced adjustable spacers 13, which are provided with a contrasting surface for restraining the external cylindrical surface of a ring 14 of an antifriction material mounted at the extremity of the sleeve 7. Of course the spacing feelers 13 may be provided with contrasting cylinders mounted on rollers or ball bearings for reducing friction.

The driving device of the cylinder of hosiery machine object of the present invention does not require any transmission and the construction of the drive motor itself is simplified and less costly then in known machines. In fact the motor, is virtually without a shaft, shaft's bearings and external pulley. Also the motor casing may be formed in an extremely economic way. Moreover it is evident the greatly reduced encumbrance that a drive made in accordance with the present invention has as compared to a known belt drive system.

Advantageously the configuration of the rotor assembly installed directly over the hosiery machine cylinder-spindle is shown in the FIGS. 3 to 6. In the embodiment depicted in FIGS. 3 and 4, the rotor of the brushless electric motor has two pairs of permanent magnets (i.e a four-pole configuration as depicted by the magnetic flux arrows drawn in FIG. 4).

The excitation magnetic circuit of the rotor illustrated in FIGS. 1 and 2, utilizes four straight, parallelepiped-shaped magnets 15, e.g. of Neodimium-Iron-Boron or of Cobalt-Samarium, radially disposed at regular intervals inside respective cavities which are defined by radially oriented lateral faces of polar expansions pieces 16 of a ferromagnetic material having the shape of channeled sectors of an hollow cylinder, having a longitudinal channel 17 with a substantially triangular cross-section, the base of which is open toward the inner circumference of the sectors and the vertex of which extends toward the outer circumference of the sectors. The longitudinal channel being cut in a middle position in respect to the two radially oriented terminal faces of each sector constituting a polar extension piece or more simply a polar expansion.

Figure 3:
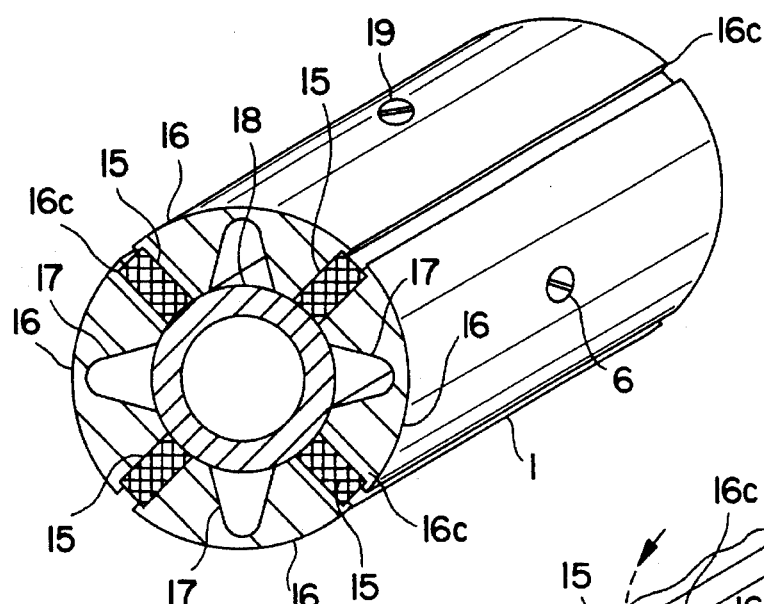
FIG. 3 is a partially sectioned prospective view of a rotor assembly in accordance with a preferred embodiment of the present invention.

As may be observed in FIG. 3, each magnetic semicircuit of the rotor comprises a permanent magnet 15 and two halves of the two ferromagnetic polar expansion pieces 16, coupled with the permanent magnet.

The substantially cylindrical, magnetic circuit portion of the rotor which is formed by the magnets 15 and by the polar expansions 16, may be mounted, as shown, on a sleeve 18 of an amagnetic material, such as for example aluminum. The sleeve 18 may have a key way-channel or other similar means for mechanically coupling with a motor spindle, which, in accordance with the main objective of the present invention, consists of the hollow cylinder of a hosiery machine. The amagnetic nature of the sleeve 18 onto which the ferromagnetic parts of the rotor are assembled prevents an undesired closing of the magnetic circuit through a ferromagnetic cylinder-spindle.

Of course the cylinder of the hosiery machine itself may be advantageously made with an amagnetic material and in this case the magnetic parts of the rotor may be directly assembled on the outer cylindrical surface of the machine's cylinder.

Figure 4:
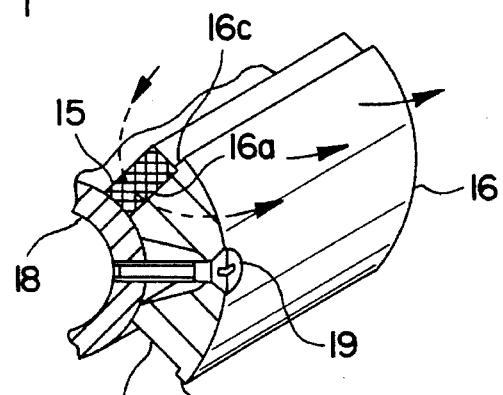
FIG. 4 is an enlarged detail of the rotor assembly depicted in FIG. 3.

As shown in FIGS. 3 and 4, the polar expansions 16 may be of machined low-carbon steel and may be individually fastened to the amagnetic sleeve 18 (or to the machine's hollow cylinder) by one or more retaining screws 19. Each polar expansion piece 16 has two radially oriented lateral faces 16a and 16b, respectively, which magnetically couple with the opposite faces of a respective permanent magnet 15. The terminal coupling faces of each polar expansion may be provided with a tangentially protruding lip-portion 16c having the function of retaining the permanent magnet 15. The permanent magnets 15 are positively retained in the respective housings, even if the adhesive which is normally used for assemblying the parts together should fail. Also the assembly operations of the rotor are greatly simplified by the special configuration of the invention. The polar expansions, shaped as cylindrical sectors, may be mounted on the sleeve 18 without completely tightening the retaining screws 19. At this point a certain amount of adhesive paste may be applied inside the permanent magnet housings before inserting the permanent magnets strips 15 and finally tightening the screws 19 to complete the assembly. The rotor assembly may be machined and dynamically balanced before completing the motor assembly.

Figure 5:
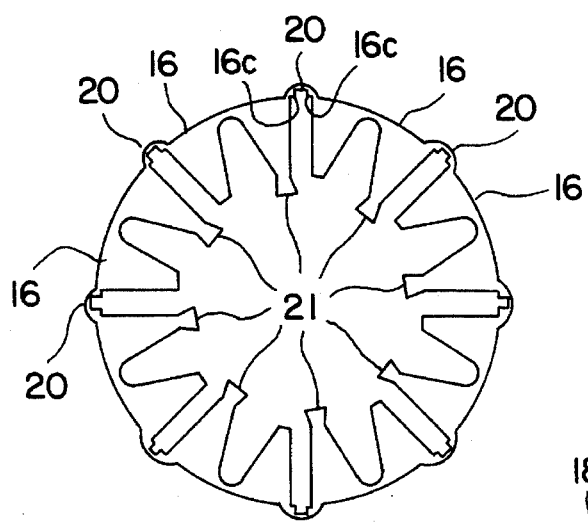
FIG. 5 depicts a die-stamped ferromagnetic lamina used for making a rotor's magnetic pack, in accordance with a preferred embodiment of the present invention.
Figure 6:
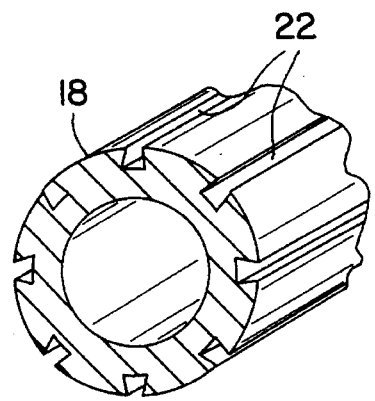
FIG. 6 is a partial prospective view of an amagnetic cylindrical sleeve onto which the ferromagnetic die-stamped laminae of FIG. 5 may be assembled.

Of course the polar expansions may also be customarily formed by a pack of die-stamped ferromagnetic laminae. One of these die-stamped ferromagnetic laminae for an eight-pole motor is depicted in FIG. 5. So as die-stamped, the various sectors of the relative polar expansion lamina are held together by metal bridges 20 which connect the two outer ends of the protruding lip-portions 16c of the die-stamped aperture which will constitute the cavity into which the permanent magnets will be housed. Also in this case, because of the fact that the permanent magnets are entirely contained within the outer cylindrical surface of the rotor, the rotor assembly once completed may be machined at a lathe for eliminating the metal bridges 20 as well as for rectifying the outer cylindrical surface of the rotor itself. In order to make assemblying easier, each cylindrical sector of the die-stamped laminae has a trapezoidally shaped extension 21, which fits into purposely made longitudinal channels 22, having an inverted trapezoidal cross-section on the outer cylindrical surface of a sleeve 18 or, as the case may be, of the cylinder-spindle of the hosiery machine, as schematically shown in FIG. 6.

I claim:

1. A rotor assembly forming with a stator a brushless motor for driving a ferromagnetic cylinder-spindle of a hosiery machine having a knitting head rotatably connected to said cylinder-spindle, comprising:

an amagnetic sleeve concentrically fitted over an outer cylindrical surface of the ferromagnetic cylinder-spindle of the hosiery machine, for preventing magnetic coupling with the ferromagnetic cylinder-spindle;

a plurality of ferromagnetic polar expansion portions in the form of cylindrical sectors fitted over and fastened to said amagnetic sleeve, wherein each of said ferromagnetic polar expansion portions comprises a substantially triangular-shaped channel facing an inner circumference of said amagnetic sleeve; and a plurality of parallelepiped-shaped permanent magnets closely fitted between adjacent ferromagnetic polar expansion portions in alternating manner, for generating a magnetic field in the motor.

2. A device according to claim 1, wherein each of said ferromagnetic polar expansion portions in the form of cylindrical sectors comprises a lip-portion on an outer circumference for securing said permanent magnet.

3. A brushless motor device for driving a ferromagnetic cylinder-spindle connected to a knitting head of a hosiery machine, comprising:

a cylindrical stator having wound thereon a plurality of parallel wires forming a single winding; and a rotor assembly concentrically spaced apart from said cylindrical stator, wherein said rotor assembly comprises: (a) an amagnetic sleeve concentrically fitted over an outer cylindrical surface of the ferromagnetic cylinder-spindle of the hosiery machine, for preventing magnetic coupling with the ferromagnetic cylinder-spindle; (b) a plurality of ferromagnetic polar expansion portions in the form of cylindrical sectors fitted over and fastened to said amagnetic sleeve, wherein each of said ferromagnetic polar expansion portions comprises a substantially triangular-shaped channel facing an inner circumference of said amagnetic sleeve; and (c) a plurality of parallelepiped-shaped permanent magnets closely fitted between adjacent ferromagnetic polar expansion portions in alternating manner, for generating a magnetic field in the motor.

4. A device according to claim 3, wherein each of said ferromagnetic polar expansion portions in the form of cylindrical sectors comprises a lip-portion on an outer circumference for securing said permanent magnet.

5. A rotor assembly of a brushless motor device for driving a ferromagnetic cylinder-spindle connected to a knitting head of a hosiery machine, comprising:

an amagnetic sleeve concentrically fitted over an outer cylindrical surface of the ferromagnetic cylinder-spindle of the hosiery machine, said amagnetic sleeve having a plurality of longitudinal channels on an outer cylindrical surface;

a plurality of ferromagnetic polar expansion portions in the form of cylindrical sectors fitted over and fastened to said amagnetic sleeve, wherein each of said ferromagnetic polar expansion portions comprises a substantially triangular-shaped channel facing an inner circumference of said amagnetic sleeve and including a plurality of inwardly extending anchoring extensions for closely fitting into said channels of said amagnetic sleeve; and a plurality of parallelepiped-shaped permanent magnets closely fitted between adjacent ferromagnetic polar expansion portions in alternating manner, for generating a magnetic field in the motor.

6. A rotor assembly for a permanent magnet motor for a hosiery machine having a knitting head rotatably mounted on the machine and connected to a cylinder-spindle, which comprises:

an amagnetic sleeve surrounding said cylinder-spindle of a hosiery machine, and connected therewith by a spline coupling, and having a plurality of longitudinal channels facing said cylinder-spindle;

a plurality of die-stamped ferromagnetic laminae stacked together having inwardly extending anchoring extensions dovetailing into said longitudinal channels of said amagnetic sleeve, and having a plurality of spaced ferromagnetic polar expansion portions in the form of cylindrical sectors having a triangular-shaped inwardly diverging channel, having a continuous bridging removable rim portion for magnetically separating said ferromagnetic polar expansion portions, and having tangentially protruding magnet retaining lip portions; and a plurality of parallelepiped-shaped flat bar magnets having a magnetic axis normal to their major faces, fitting in separation spaces between adjacent ferromagnetic polar expansion portions of said plurality of ferromagnetic laminae.

7. A permanent magnet motor for a hosiery machine having a knitting head rotatably mounted on the machine and connected to a cylinder-spindle, having a permanent magnet rotor assembly fitted over said cylinder-spindle comprising:

an amagnetic sleeve surrounding said cylinder-spindle and having a plurality of longitudinal channels with an inwardly diverging cross section facing said cylinder spindle;

a plurality of die-stamped ferromagnetic laminae stacked together having inwardly extending anchoring extensions dovetailing into said longitudinal channels of said amagnetic sleeve, and having a plurality of spaced ferromagnetic polar expansion portions in the form of cylindrical sectors with a triangular-shaped inwardly diverging channel, having a continuous removeable bridging rim portion connecting said ferromagnetic laminae for magnetically separating said ferromagnetic polar expansion portions, and having a tangentially protruding magnet retaining lip portions; and parallelelepiped-shaped flat bar magnets having a magnetic axis normal to their major faces, closely fitting in the separation spaces between adjacent ferromagnetic polar expansion portions of said plurality of ferromagnetic laminae.

* * * * *